United States Patent [19]
Aben et al.

[11] Patent Number: 5,742,119
[45] Date of Patent: Apr. 21, 1998

[54] CATHODE RAY TUBE COMPRISING A DISPLAY SCREEN HAVING AN ELECTROCONDUCTIVE COATING

[75] Inventors: Gerardus V. A. Aben; Leo H. M. Krings, both of Eindhoven, Netherlands

[73] Assignee: U.S. Philips Corporation, New York, N.Y.

[21] Appl. No.: 512,424

[22] Filed: Aug. 8, 1995

[30] Foreign Application Priority Data

Aug. 8, 1994 [EP] European Pat. Off. ............. 94202280

[51] Int. Cl.$^6$ .................................................. H01J 31/00
[52] U.S. Cl. .................... 313/479; 313/478; 313/112; 313/313
[58] Field of Search ................... 313/479, 478, 313/480, 635, 112, 313; 359/614, 885; 348/834, 820

[56] References Cited

U.S. PATENT DOCUMENTS

| | | | |
|---|---|---|---|
| 4,798,994 | 1/1989 | Rijpers et al. | 313/478 |
| 4,804,883 | 2/1989 | Muller et al. | 313/479 X |
| 4,987,338 | 1/1991 | Itou et al. | 313/479 X |
| 5,291,097 | 3/1994 | Kawamura et al. | 313/479 X |
| 5,412,278 | 5/1995 | Iwasaki | 313/479 X |
| 5,412,279 | 5/1995 | De Boer | 313/479 |
| 5,446,339 | 8/1995 | Kinoshita et al. | 313/479 X |
| 5,523,649 | 6/1996 | Tong et al. | 313/479 |
| 5,534,748 | 7/1996 | Oomen | 313/479 |

FOREIGN PATENT DOCUMENTS 4229192  3/1994  Germany.

OTHER PUBLICATIONS

H. Schmidt in J. Non–Crystalline Solids, 63 681–691. Dec. 1985.

J.A. Walker et al, J. Polym, Chem., 26 1285–1294. Dec. 1988.

*Primary Examiner*—Ashok Patel
*Attorney, Agent, or Firm*—John C. Fox; Norman N. Spain

[57] ABSTRACT

The display screen 3 of a cathode ray tube 1 is provided with an electroconductive coating 8 of poly-3,4-ethylene dioxythiophene. The layer 8 has a sheet resistance of 1 k$\Omega$/□ and a high transmission. The layer 8 provides an effective shield against electromagnetic radiation. The coating can be provided with additional layers of, for example, silicon dioxide to improve the mechanical properties.

7 Claims, 3 Drawing Sheets

CATHODE RAY TUBE COMPRISING A DISPLAY SCREEN HAVING AN ELECTROCONDUCTIVE COATING

BACKGROUND OF THE INVENTION

The invention relates to a cathode ray tube comprising a display screen having an electroconductive coating which contains poly-3,4-ethylene dioxythiophene.

The invention further relates to a method of manufacturing an electroconductive coating on a display screen.

Electroconductive coatings are inter alia used as antistatic layers on display screens of display devices, in particular cathode ray tubes (CRTs). Said layers have a sheet resistance, for example, of $10^6$ to $10^{10}$ $\Omega/\square$ and are hence sufficiently electroconductive to ensure that a high electrostatic voltage present on the outside surface of the display screen is removed within a few seconds. Thus, the user does not experience an unpleasant shock if he touches the screen. Besides, the attraction of atmospheric dust is reduced.

Since it may be hazardous to health, shielding from electromagnetic radiation is becoming ever more important. Cathode ray tubes, such as display tubes for TVs and monitor tubes, comprise a number of radiation sources which may be hazardous to the user's health if he is exposed to said sources for a long period of time. A substantial part of the electromagnetic radiation generated can be screened off with metal in a simple manner via the housing of the cathode ray tube. However, radiation emitted via the display screen may substantially add to the amount of radiation to which the user is exposed.

This problem is solved by applying a well-conducting coating on the surface of the display screen. Said coating must also be sufficiently transparent in the wavelength range of from 400 to 700 nm, i.e. the transmission must be at least 60%. A well-known material which can be used for a transparent and well-conducting coating which meets said requirements is indium-doped tin oxide (ITO). Such a layer can be provided by means of vacuum evaporation or sputtering. Said method requires, however, expensive vacuum equipment. ITO layers can also be manufactured by firing spin-coated or sprayed layers of solutions of indium-tin salts. Said firing operation should be carried out at a temperature of at least 300° C. This temperature is much too high to be used with a complete display tube which, in order to preclude damage to parts of the display tube, can withstand temperatures of maximally 160° C.

In German Patent Application DE-A-4229192, a description is given of the manufacture of an antistatic coating for, inter alia, a display screen, said coating being made from poly-3,4-ethylene dioxythiophene and a trialkoxysilane to improve the adhesion. By way of example, a coating is manufactured by providing a desalinated aqueous solution of poly-3,4-ethylene dioxythiophene, polystyrene sulphonic acid and 3-glycidoxypropyl trimethoxysilane on a glass plate, whereafter said glass plate is dried. Said poly-3,4-ethylene dioxythiophene is previously prepared by oxidatively polymerizing the monomer 3,4-ethylene dioxythiophene by means of an Fe(III) salt in water in the presence of polystyrene sulphonic acid to preclude precipitation. The antistatic layer thus obtained has a thickness of 0.6 μm (600 nm) and a sheet resistance of 50 k$\Omega/\square$. This sheet resistance is sufficient to bring about an antistatic effect.

A disadvantage of said known layer is that the shielding against electromagnetic radiation is insufficient. Future standards require the electrical field intensity measured at a distance of 0.3 m from the display screen to be maximally 10 V/m in the frequency range 50 Hz–2 kHz and 1 V/m in the frequency range 2–400 kHz. Experiments have shown that in order to meet these requirements the sheet resistance must be below 3 k$\Omega/\square$ and preferably maximally 1 k$\Omega/\square$, taking into account that the sheet resistance may increase with time.

A property of the known antistatic layer is that it is of a blue colour, although it is transparent. Since the sheet resistance is inversely proportional to the layer thickness, a greater layer thickness will lead to a lower sheet resistance. However, as a result thereof the transmission of the layer in the orange-red wavelength range decreases substantially and the blue colour becomes even more intense.

OBJECTS AND SUMMARY OF THE INVENTION

It is an object of the invention to provide, inter alia, an electroconductive coating on a display screen of a cathode ray tube, said coating providing an effective shield against electromagnetic radiation, while satisfying the above-mentioned requirements. The layer must be homogeneous and exhibit good optical properties, such as a transmission of at least 60% in the wavelength range of from 400 to 600 nm. The layer must adhere well to the display-screen surface. Besides, the layer must be compatible with additional antireflective layers and/or layers to improve the mechanical properties, such as the scratch resistance. A further object of the invention is to provide a simple method of manufacturing such well-conducting coatings, and it must be possible, in particular, to carry out said method at relatively low temperatures (maximally 160° C.) at which no damage is caused to parts of a cathode ray tube.

These objects are achieved by a cathode ray tube as described in the opening paragraph, which is characterized according to the invention in that the coating has a layer thickness of maximally 100 nm and a sheet resistance of less than 3 k$\Omega/\square$. The sheet resistance of the coating is preferably maximally 1 k$\Omega/\square$. In accordance with the above-mentioned requirements, such a layer provides an effective shield against electromagnetic fields. In addition, the coating is so thin that it exhibits a transmission in excess of 60% in the wavelength range of from 400 to 700 nm. Blueing of the coating on a display screen is hardly visible.

The much lower sheet resistance of the coating in accordance with the invention as compared to the known coating can be attributed to the method of preparing the coating, which will be described hereinbelow.

The scratch resistance and the abrasion resistance of the electroconductive coating in accordance with the invention are mediocre and insufficient for most applications. The scratch resistance of the coating can be improved by adding an oxide of silicon, titanium, zirconium or aluminium to the coating. These additives can be easily provided by adding the corresponding alkoxy compounds, for example tetraethyl orthosilicate (TEOS), to the liquid from which the coating is applied. By means of a sol-gel process, the alkoxy compounds are converted to the corresponding metal oxides. This has the disadvantage, however, that the sheet resistance increases and the shielding from electromagnetic radiation is no longer sufficient. The layer does still have antistatic properties.

For this reason, the coating is preferably covered with an additional layer having better mechanical properties, which additional layer does not adversely affect the optical and electrical properties and, in addition, adheres well to the coating.

The combination of an electroconductive coating having a sheet resistance of approximately 2 kΩ/□ in accordance with the invention and one or more additional scratch resistant layers can also suitably be used as a touch screen coating on a display screen. By touching a certain pan of the touch screen coating on the display screen, a local change in resistance is induced which is translated, via electronic controls, into a localization and a subsequent action, such as opening a menu, turning pages etc. It is alternatively possible to write on the display screen with a pen, whereafter the writing is identified and processed.

For the additional layer use can possibly be made of a silicon dioxide layer having a thickness of from 50 to 250 nm. Besides, such an additional layer protects the polymeric coating against discoloration caused by sunlight. Using a tetraalkoxysilane, such as TEOS, as the precursor, such a layer can be provided in a simple manner by means of a sol-gel process. Curing takes place at a temperature of maximally 160° C. The layer meets the customary requirements regarding hardness, abrasion resistance and scratch resistance.

The electroconductive coating may also be covered with two additional layers, namely a first additional layer of titanium dioxide (refractive index 2.05) and a second additional layer of silicon dioxide (refractive index 1.44). The refractive index of the polymeric coating is 1.64. These data can be used to calculate a layer stack the individual layers of which have a thickness such that the layer packet exhibits an antireflective effect in a specific wavelength range. Antireflective layers are used on display screens to suppress disturbing reflections (specular reflection). In a typical embodiment, the layer thickness of the polymeric coating is 80 nm and the layer thicknesses of the titanium-dioxide layer and silicon-dioxide layer are 129 nm and 93 nm, respectively. In the green wavelength range, this layer stack exhibits a reflection of less than 1%. Said additional layers can also be provided by means of a sol-gel process, in which a tetraalkoxytitanate is used as the precursor for the titanium-dioxide layer. These additional layers also improve the mechanical properties, such as hardness, abrasion resistance, scratch resistance and the light fastness of the polymeric coating.

A very suitable coating is obtained by providing the electroconductive coating with three additional layers, namely a first additional layer of silicon dioxide, a second additional layer of titanium dioxide and a third additional layer of silicon dioxide. If the layers are applied in suitable thicknesses, the reflection is reduced to less than 0.5%. As described hereinabove, also these layers can be provided by means of a sol-gel process.

A very suitable additional layer on the coating is characterized in that said layer comprises an inorganic network of at least silicon oxide and chains of an organic polymeric component intertwined therewith. A sol-gel process can be used to provide such a hybrid inorganic-organic layer in relatively thick layers of 0.8 to 10 μm or more on the coating, without this leading to cracks (crackles). This composite material is described in an article by H. Schmidt in J. Non-Crystalline Solids, 63 (1985) 681–691. The use of such a material as a contrast-improving layer on a display screen is described in the non-prepublished European Patent Application EP 94200541.4, application Ser. No. 08/395,948 filed Feb. 28, 1995 and now U.S. Pat. No. 5,534,748. The layer described therein is composed of an inorganic network of silicon oxide and an oxide of Al, Ti, Zr or Ge and a polymeric component whose chains are chemically bonded to the Si atoms of the network and are intertwined therewith. A black dye is dissolved in the layer to reduce the transmission, which results in an improved image contrast. Examples of polymeric components are polyether, polyacrylate and polyvinyl. The additional layer is manufactured by a method as described hereinbelow. The polymeric chains are chemically bonded to and intertwined with the inorganic network. This results in mechanically strong and thermally stable coatings. The organic polymer provides the hybrid material with an increased impact resistance, while the three-dimensional inorganic network of silicon and the above-mentioned metal oxides provides the material with an increased hardness and scratch resistance.

As the polymeric electroconductive coating has a higher refractive index than the glass of the display screen and the several μm thick additional layer of hybrid inorganic-organic material, interference patterns may become visible if the thickness of the additional layer is not uniform. Said interference patterns become visible at layer thickness differences in the additional layer of several tens of nanometers. This problem can be precluded by manufacturing the additional layer in a thickness of several tens of μms or by matching the refractive index of the electroconductive coating with that of the additional layer. It has been found that poly-3,4-ethylene dioxythiophene can be mixed with the hybrid inorganic-organic material, as a result of which the refractive index of the electroconductive coating better matches that of the additional layer. As a result, the amplitude of the interferences in the reflection spectrum decreases.

For the manufacture of an electroconductive coating having a matched refractive index, a coating solution, which will be specified hereinbelow, is mixed with a coating solution from which the hybrid additional layer is manufactured. For example, 60 g of the coating solution for the electroconductive coating in accordance with exemplary embodiment 1 are mixed with 5 g of the coating solution for the additional coating of exemplary embodiment 3. Matching of the refractive index of the electroconductive coating can also be accomplished by mixing an epoxy resin to the coating solution. For example, 60 g of the coating solution for the electroconductive coating are mixed with 2 g epoxy resin. It is remarkable that there is no appreciable deterioration of the electrical conductivity of the coating obtained.

By virtue of the relatively large thickness of a hybrid inorganic-organic additional layer, this layer can comprise a relative large quantity of a dye or pigment to increase the image contrast. An example of a suitable dye is the light-fast black dye sold by Ciba-Geigy as ORASOL BLACK CN™ (Colour Index: Solvent Black 28).

The polymeric coating comprising poly-3,4-ethylene dioxythiophene is slightly blue in colour. If this is undesirable, a yellow dye can be added to the additional coating of silicon dioxide or to the hybrid inorganic-organic coating. Suitable yellow dyes are, for example, Zapon yellow 100 (Colour Index SY 32) and Zapon yellow 141 (Colour Index SY 81), which are both supplied by BASF. These azo-methane dyes can readily be dissolved in the alcoholic solutions used for the sol-gel process. The total coating thus obtained, that is the combination of the electroconductive coating and the additional layer, is of a neutral colour and has a contrast-improving effect. Optionally, a second or third dye can be added to the additional layer.

The object of providing a simple method of manufacturing an electroconductive coating on a display screen of a cathode ray tube is achieved in accordance with the invention in that the coating is manufactured by applying a layer of a solution of 3,4-ethylene dioxythiophene, an organic base, and an Fe(III) salt on the display screen, whereafter a treatment at an increased temperature is carried out, thereby forming a layer comprising poly-3,4-ethylene dioxythiophene and an Fe(II) salt, after which the layer is extracted with a solvent for Fe salts, thereby forming the electroconductive coating.

In general, polymers are slightly soluble. In order to obtain a processable polymeric solution, in the known method the polymerization reaction is carried out in the presence of a large quantity of a stabilizing polymer, such as polystyrene sulphonic acid. Said polymer, however, leads to an increase of the sheet resistance. In the method in accordance with the invention, instead of a solution of the polymer, a solution of the monomer is provided on the surface of the display screen. The monomer is subsequently converted to the polymer. The monomer 3,4-ethylene dioxythiophene is converted to the corresponding polymer by means of oxidation with an Fe(III) salt. Fe(III) salts are very suitable because of the redox potential ($E_{red}$=0.77 V at room temperature) which is very favourable for this reaction. Fe(III) salts of organic sulphonates are very suitable because of their high solubility in alcohols and low crystallization rate in the liquid layer to be provided. Examples of said salts are Fe(III)-p-toluene sulphonate and Fe(III)-ethylbenzene sulphonate.

Solutions of 3,4-ethylene dioxythiophene monomers and Fe(III) salt, which is necessary for the polymerization reaction, are instable. When said components are mixed, a polymer soon forms in the solution, as a result of which the pot-life of the coating solution becomes impractically short. Surprisingly, it has been found that the reaction rate of the polymerization reaction is decreased by adding small quantities of a soluble organic base to the coating solution. Dependent upon the concentration of the base, the reaction at room temperature can be suppressed completely. In the case of an efficacious base concentration, solutions comprising monomers and the Fe(III) salt can remain stable at room temperature for at least 24 hours: polymerization does not take place. These stable solutions can be used to apply thin layers to the display screen by, for example, spin coating. After heating of the layer, electroconductive poly-3,4-ethylene dioxythiophene is formed. Besides, it has been found that the addition of the organic base has a favourable effect on the conductivity of the polymer and hence on the sheet resistance of the conductive coating. Presumably, the organic base forms a complex with the Fe(III) salt, which results in a reduction of the redox potential at room temperature. This leads to a reduction of the reaction rate, so that a more controlled polymerization at an increased temperature takes place and the specific conductivity increases by approximately a factor of two.

Suitable soluble bases for this method include, for example, imidazole, dicyclohexylamine and 1,8-diazabicyclo(5.4.0)undec-7-ene (DBU).

Said compounds can readily be dissolved in various alcohols, such as isopropanol and 1-butanol. A solution of said compounds, for example, in 1-butanol is used as the coating solution and has a pot-life of approximately 12 hours. Preferably, before the coating solution is used, it is filtered over an 0.5 µm filter.

The adhesion of the coating to the glass surface can be sufficiently improved by adding a trialkoxysilane comprising an epoxy group as the functional group to the coating solution. The concentration in the coating solution is not critical and amounts to, for example, 0.01–1 wt. %.

Examples of suitable silanes are 3-glycidoxypropyltrimethoxysilane and 2-(3,4-epoxycyclohexyl)ethyl trimethoxysilane (for example the types A187 and A186, supplier Union Carbide Corp.). Type A187 can be used up to a concentration of 50 wt. % in the coating without causing an increase of the sheet resistance of the coating. However, the quantity of trialkoxy silane is maximally 25 wt. % because larger quantities will lead to phase separation, which manifests itself as specks in the coating.

The adhesion of the coating to the glass surface can also be improved by subjecting the glass surface to a pretreatment (priming) with an aqueous solution of one of the above-mentioned alkoxysilanes. A silane which is very suitable for this purpose is N-(3-trimethoxy silyl propyl) pyrrole. An aqueous solution of said silane can for example be applied to the glass surface by means of spin coating. After heating of the glass surface to, for example, 110° C., the alkoxy groups condense with hydroxyl groups of the glass surface. During oxidative polymerization of 3,4-ethylene dioxythiophene, the pyrrole end groups are incorporated in the polymeric chains. Said silane may also be added to the coating solution for the electroconductive coating in an amount of 100 mg per 80 g solution. In this way, the slightly bluish colour of the electroconductive coating is change into neutral black.

The coating solution can be provided on the display screen by means of customary methods, such as spraying or atomizing. The solution is preferably spin coated onto the display screen. This results in a smooth, homogeneous and thin layer. During spin coating, the layer provided is dried and subsequently heated to a temperature of maximally 160° C. by means of a furnace, a jet of hot air or an infrared lamp. At a temperature between 100° and 150° C., the polymerization reaction is completed within 2 minutes. The increased temperature initiates the polymerization reaction in which the Fe(III) salt is converted to the corresponding Fe(II) salt. The colour of the coating changes from yellow to blueish green. The eventual thickness of the coating depends on the number of revolutions during spin coating and on the concentration of the dissolved compounds.

The Fe(III) and Fe(II) salts must be removed from the coating to prevent a dull layer as a result of crystallization. In addition, the Fe(II) salt leads to an increase of the sheet resistance of the coating by a factor of ten. The Fe salts are removed by rinsing the coating with a suitable solvent, preferably water. In this process, the Fe salts are extracted from the coating.

The polymeric layer obtained in accordance with the inventive method has a specific conductivity of approximately 300 S/cm. This means that a 30 nm thick coating has a sheet resistance of 1 kΩ/□. The coating is slightly blue in colour yet has a transmission of at least 70% over the entire visible wavelength range.

To improve the mechanical properties and the stability of the electrical conductivity, preferably at least one additional layer is applied to the electroconductive coating. A suitable additional layer is a layer of silicon dioxide having a thickness of 50–250 nm. In accordance with the invention, the method is characterized in that the electroconductive coating is provided with a layer of a solution of an alkoxysilane compound, whereafter said alkoxysilane compound is converted to an additional layer of silicon dioxide by subjecting it to a treatment at an increased temperature. If the additional layer is provided by spin coating, the layer thickness obtained depends inter alia on the number of revolutions and the viscosity of the solution.

Spraying or atomizing of the alkoxysilane solution results in a matt surface texture, so that the layer obtained exhibits an antiglare effect. As a result, ambient light is diffusely reflected.

Conversion into silicon dioxide takes place by means of a sol-gel process for at least 30 minutes at a temperature between 150° and 160° C. In this process, the alkoxy groups of the alkoxysilane compound are converted by acidified water into hydroxy groups (hydrolysis) which react with each other and with hydroxy groups of the glass surface of the display screen. During the drying and heating processes, a properly adhering network of silicon dioxide is obtained by polycondensation.

An alkoxysilane compound which can suitably be used in the method in accordance with the invention is tetraethyl orthosilicate (TEOS, $Si(OC_2H_5)_4$). It is alternatively possible to use other known alkoxysilane compounds of the type $Si(OR)_4$ and oligomers thereof, wherein R is an alkyl group, preferably a $C_1$–$C_5$ alkyl group. For the solvent use is made of a water-alcohol mixture, such as methanol, ethanol, propanol or butanol.

As indicated hereinabove, the coating an of the electroconductive coating and a first additional layer of titanium dioxide and a second additional layer of silicon dioxide or, in succession, silicon dioxide, titanium dioxide and silicon dioxide, exhibit an antireflective effect if the optical layer thicknesses of these layers are equal to $\lambda/4$. $\lambda$ is the wavelength at which the reflection must be minimal. The required layer thickness can be determined by calculating. Important process parameters defining the layer thicknesses are the number of revolutions during spin coating and the concentration of the solution.

A method of providing an antireflective structure is characterized in that the electroconductive coating is provided with a layer of a solution of an alkoxytitanium compound, whereafter said alkoxytitanium compound is converted to a first additional layer of titanium dioxide by subjecting it to a treatment at an increased temperature, after which a layer of a solution of an alkoxysilane compound is provided on the first additional layer of titanium dioxide, whereafter the alkoxysilane compound is treated at an increased temperature to convert it to a second additional layer of silicon dioxide, the thicknesses of the electroconductive coating and the additional layers being selected so that said layers jointly exhibit an antireflective effect. The titanium-dioxide layer is manufactured in a similar manner as the silicon-dioxide layer by using a suitable titanium-dioxide precursor, for example tetraethoxy-titanate $Ti(OC_2H_5)_4$, as the starting material.

An alternative method of providing an antireflective structure is characterized in that the electroconductive coating is provided with a layer of a solution of an alkoxysilane compound, whereafter said alkoxysilane compound is treated at an increased temperature to convert it to a first additional layer of silicon dioxide, after which said first additional layer is provided with a layer of a solution of an alkoxytitanium compound, whereafter said alkoxytitanium compound is treated at an increased temperature to convert it to a second additional layer of titanium dioxide, after which said second additional layer of titanium dioxide is provided with a layer of a solution of an alkoxysilane compound, whereafter said alkoxysilane compound is treated at an increased temperature to convert it to a third additional layer of silicon dioxide, the thicknesses of the electroconductive coating and the additional layers being selected so that the layers jointly exhibit an antireflective effect. As mentioned hereinabove, a layer structure of three additional layers results in an even lower reflection.

The electroconductive coating can alternatively be provided with an additional coating of a hybrid inorganic-organic material. This composite material comprises an inorganic network of at least silicon oxide and chains of an organic polymeric component intertwined therewith.

A method which can be used for this purpose is characterized in that the electroconductive coating is provided with a layer of a solution of a trialkoxysilane compound with a polymerizable group, whereafter said trialkoxysilane compound is subjected to a treatment at an increased temperature to convert it to an inorganic network of silicon oxide and to a polymer formed from the polymerizable group, said polymer being chemically bonded to and intertwined with the inorganic network.

The coating solution for the manufacture of a hybrid inorganic-organic additional layer comprises a trialkoxysilane of the formula:

$$(RO)_3Si\text{—}R^1$$

wherein R is an alkyl group and $R^1$ is a polymerizable group, and wherein $R^1$ is chemically bonded to the Si atom via an Si—C bond. The R group is preferably a $C_1$–$C_5$ alkyl group. Examples of suitable polymerizable $R^1$ groups are epoxy, methacryloxy and vinyl groups. Suitable examples of trialkoxysilanes with polymerizable $R^1$ groups are 3-glycidoxypropyl-trimethoxysilane, 3-methacryloxypropyl-trimethoxysilane and vinyltriethoxysilane. In the sol-gel process, the alkoxysilanes hydrolyse and condense to form an inorganic network of silicon oxide, the polymerizable groups forming polymeric chains which are chemically bonded to the inorganic network via Si—C bonds. The epoxy groups, methacryloxy groups and vinyl groups polymerize into, respectively, a polyether, a polymethacrylate and a polyvinyl. The epoxy groups can be thermally polymerized, which process can optionally be catalysed by adding an amine compound to the solution. To polymerize the other groups, the layer must be exposed to UV light. The polymeric chains are chemically bonded to and intertwined with the inorganic network. This results in mechanically strong and thermally stable coatings. Preferably, a metal-alkoxy compound is added to the coating solution for the additional layer, so that a metal oxide is incorporated in the inorganic network. Suitable metal oxides are the oxides of Al, Ti, Zr or Ge. Said metal oxides improve the mechanical properties of the coating, such as hardness, abrasion resistance and scratch resistance. The coating comprises 1 to 50 mol %, preferably 5 to 35 mol %, of said metal oxide with respect to silicon oxide. The favourable effect occurs to an insufficient degree when the quantity is below 1 mol %, whereas quantities above 50 mol % do not lead to a further improvement and render the coating unnecessarily expensive. Of the above-mentioned metal oxides, incorporation of aluminium oxide leads to the best mechanical properties of the coating.

For the metal-alkoxy compounds use is made of compounds of the formula:

$$M(OR)_n$$

wherein M=Al, Ti, Zr or Ge; R is a $C_1$–$C_5$ alkyl group n is the valency of the metal M.

Examples of suitable metal-alkoxy compounds are:
tetraethoxy-germanate $Ge(OC_2H_5)_4$ (TEOG),
tetrabutoxy-zirconate $Zr(OC_4H_9)_4$ (TBOZ), tetrapropoxy-zirconate $Zr(OC_3H_7)_4$ (TPOZ), tripropoxy-aluminate $Al(OC_3H_7)_3$ (TPOAl), tributoxy-aluminate $Al(OC_4H_9)_3$ (TBOAl) and tetraethoxy-titanate $Ti(OC_2H_5)_4$ (TEOTi).

The corresponding metal oxide is incorporated in the inorganic network by hydrolysis and condensation. By virtue thereof, the above-mentioned advantages as regards chemical and mechanical resistance and light-fastness of the additional coating are achieved. The relevant coating solution may also comprise 0.01 to 10 mol % of an aminoalkoxysilane such as 3-aminopropyl-triethoxysilane, or other amine compounds, such as trimethylamine, relative to the alkoxy compounds. These amine compounds serve as a catalyst for the thermal polymerization of the epoxy groups.

The coating solution for the manufacture of a hybrid inorganic-organic additional layer comprises one or more organic solvents, such as ethanol, butanol, isopropanol and diacetone alcohol. To hydrolyse the alkoxy compounds use is preferably made of a stoichiometric quantity of water.

This coating solution can be provided on the coating by means of customary methods, such as spraying or atomizing. The alcoholic solution is preferably spin coated onto the display screen. After drying and heating to, for example, 160° C for 30 minutes, a mechanically strong, smooth and high-gloss additional layer is obtained. By virtue of the relatively mild reaction temperature, curing of the layer can take place on the display screen of a complete cathode ray tube. The thickness of this additional layer may be 10 µm or more. Apart from the organic solvents, a typical coating solution comprises the following alkoxy compounds:

10 mol % phenyl-trimethoxysilane 65 mol % 3-glycidoxypropyl-trimethoxysilane 5 mol % 3-aminopropyl-triethoxysilane 20 mol % tributoxy aluminate.

If desired, the coating solution for the additional layer of silicon dioxide or of a hybrid inorganic-organic layer may be provided with an organic pigment or dye to selectively influence the light transmission. Such pigments or dyes are selected such that light emitted by the phosphors of a cathode ray tube is selectively transmitted, whereas for example ambient light reflecting from the rear side of the display screen is absorbed. As the electroconductive coating is slightly blue in colour, preferably a yellow dye, such as one of the above-mentioned Zapon dyes, is added to the coating solution to obtain a neutral appearance.

These and other aspects of the invention will be apparent from and elucidated with reference to the embodiments described hereinafter.

DESCRIPTION OF THE PREFERRED EMBODIMENTS

Exemplary embodiment 1

Figure 1:
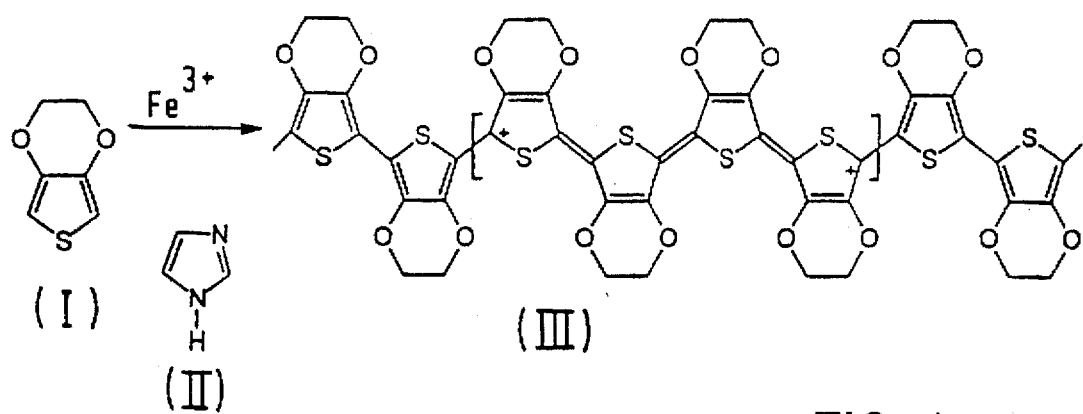
FIG. 1 shows the reaction scheme of the preparation of electroconductive poly-3,4-ethylene dioxythiophene (formula III) using 3,4-ethylene dioxythiophene (formula I) as the starting material.

In 70 g 1-butanol there is dissolved:

10 g (0.0176 mol) Fe(III)-p-toluene sulphonate 1.0 g (0.007 mol) 3,4-ethylene dioxythiophene (formula I in FIG. 1, supplier Bayer AG)

0.4 g (0.0059 mol) imidazole (formula II in FIG. 1, supplier Aldrich)

Figure 2:
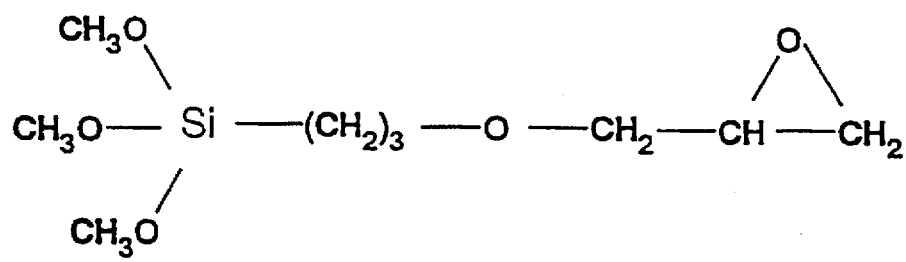
FIG. 2 shows the structural formula of 3-glycidoxypropyltrimethoxysilane.

0.05 g (0.00021 mol) 3-glycidoxypropyl-triraethoxysilane (FIG. 2, supplier Hüls).

The above-mentioned Fe(III) salt is not commercially available. This salt is prepared from freshly precipitated $Fe(OH)_3$ and a solution of the relevant organic acid in methanol. This preparation is described in an article by J. A. Walker et al., J Polym. Chem., 26 (1988) 1285–1294.

After filtration over a polyamide filter of 0.5 µm, the coating solution is ready. Due to the presence of imidazole, the polymerization reaction is suppressed and the pot-life of the solution is at least 24 hours.

A quantity of 30 ml of this solution is applied to a rotating display screen with a diagonal of 38 cm (15 inches). The solution is applied by spinning at a rate of 150 revolutions per minute. At this number of revolutions, the applied layer is subsequently dried for 1 minute.

The monomer is convened to the corresponding electroconductive polymer (formula III in FIG. 1) by heating the layer to 150° C. in a furnace for 1 minute. In this process, the colour of the layer changes from yellow to blueish green. This relatively low temperature is safe for the components of the display tube.

The layer is subsequently rinsed with water, thereby extracting the Fe(II) salts formed and the remaining Fe(III) salts. Said extraction process leads to a substantial reduction of the layer thickness. To preclude drying marks, the coating is rinsed with ethanol. After drying of the coating, it has a layer thickness of 35 nm. The adhesion of the layer meets the requirements of the tape test.

Figure 3:
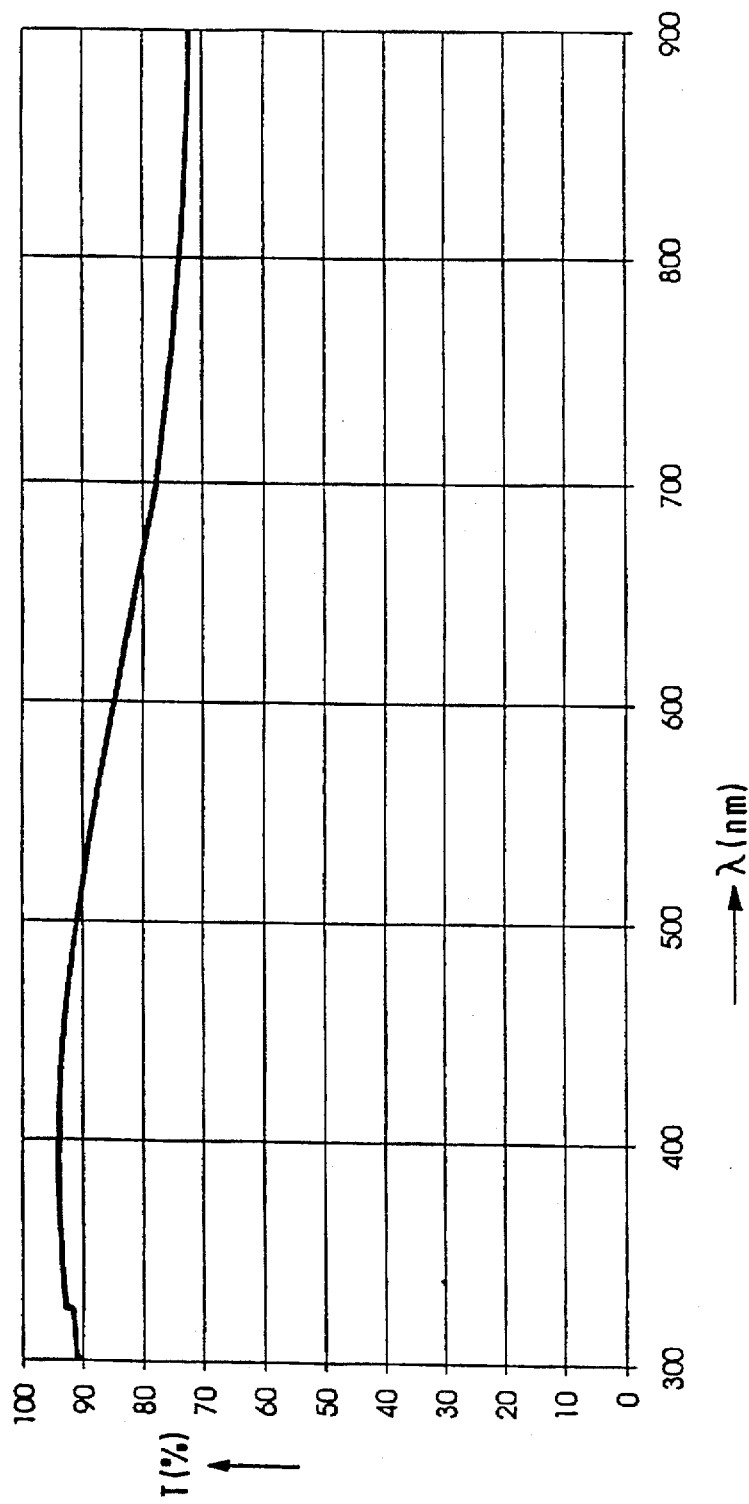
FIG. 3 shows the transmission spectrum of a coating having a thickness of 35 nm in accordance with the invention.

The transmission spectrum of the layer obtained is shown in FIG. 3. The transmission T (in percent) is plotted as a function of the wavelength λ (in nm). The layer has a high transmission in the blue wavelength range and becomes slightly absorptive of from 500 nm. Between 400 and 650 nm, the transmission is at least 80%.

The sheet resistance of the 35 nm thick coating is 1 kΩ/□ and is measured by means of the four-probe resistance measurement. At said layer thickness, the specific conductivity of the material of the layer is approximately 300 S/cm. This low sheet resistance value is sufficient to provide an effective shield against electromagnetic radiation in the frequency range between 50 Hz and 400 kHz.

Figure 4:
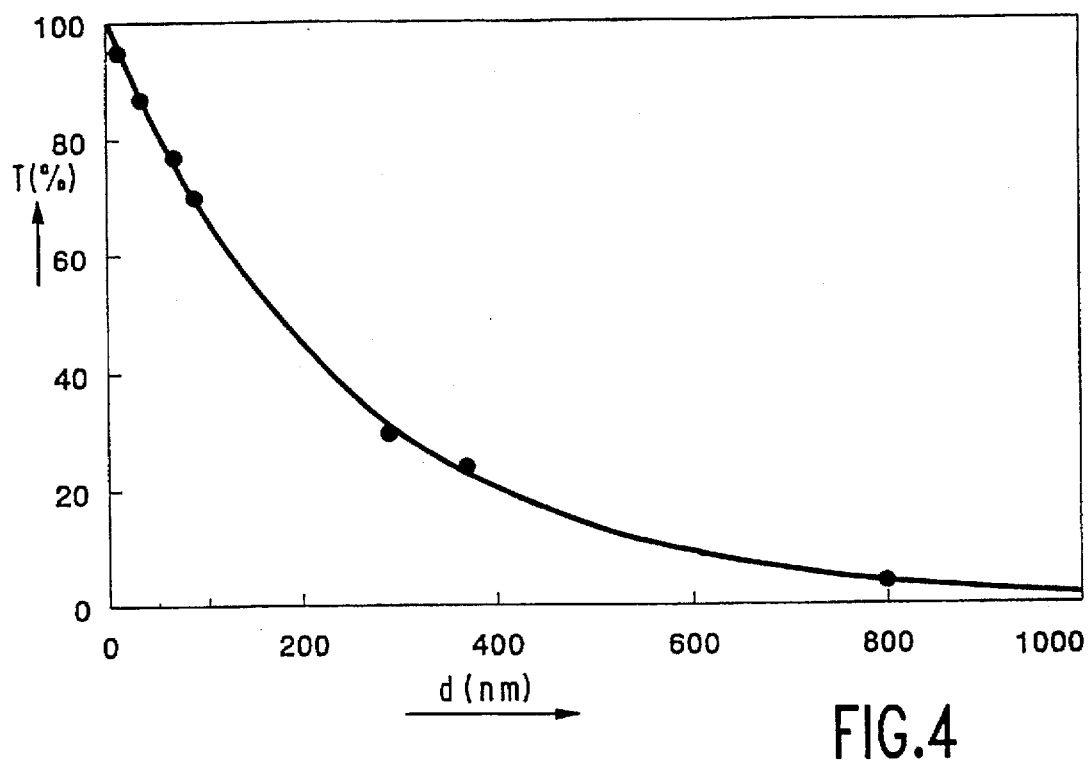
FIG. 4 shows the transmission T (in percent) at 550 nm of coatings in accordance with the invention as a function of the layer thickness d (in nm)

The layer thickness of the coating can be varied, inter alia, by varying the number of revolutions during spin coating of the layer. The dependence of the transmission T (in percent) at a wavelength of 550 nm as a function of the layer thickness d (in nm) is shown in FIG. 4. At a layer thickness above 100 nm, the transmission falls below 70%.

Figure 5:
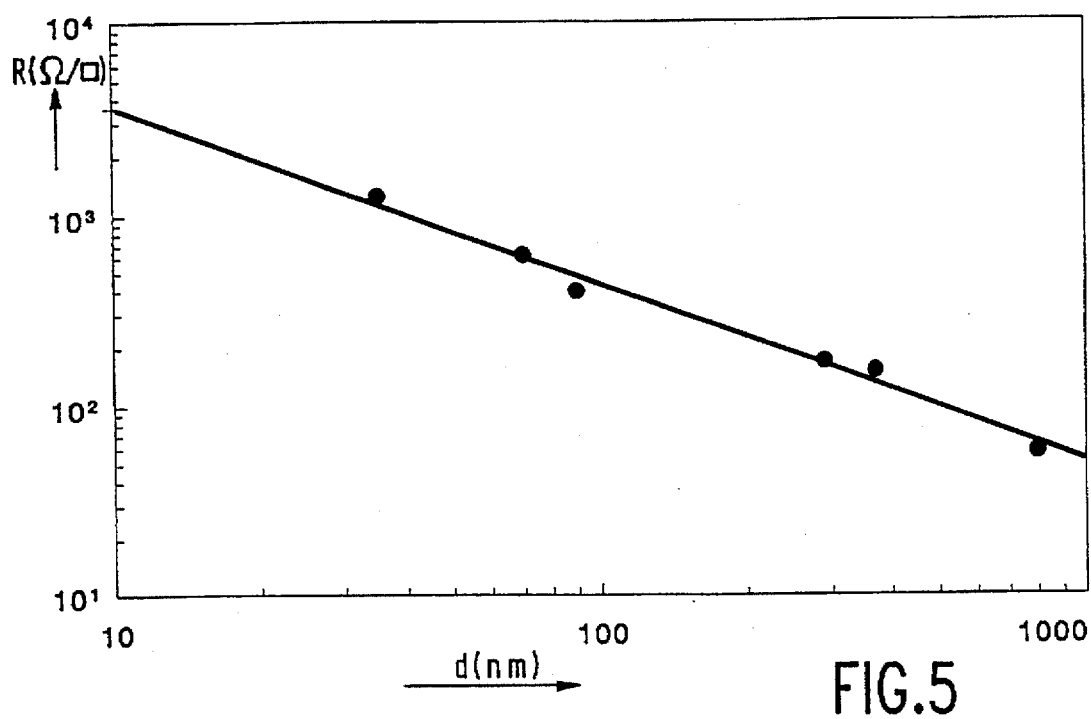
FIG. 5 shows on a double logarithmic scale the sheet resistance R (in Ω/□) as a function of the layer thickness d (in nm), and FIG. 6 schematically shows a partly cut-away view of an embodiment of a cathode ray tube in accordance with the invention.

As expected, the sheet resistance decreases as the layer thickness of the coating increases. FIG. 5 shows on a double logarithmic scale the relation between the sheet resistance R (in Ω/□) as a function of the layer thickness d (in nm). Thicker layers yield a lower sheet resistance, however, the transmission of the layer decreases accordingly.

Exemplary embodiment 2

A quantity of 12.5 g ethanol, 12.5 g hydrochloric acid (0.175 mol/l) and 25 g tetraethyl orthosilicate (TEOS) are mixed and stirred for a half hour to hydrolyse TEOS to a tetrasilanol. Subsequently, the solution is diluted with a mixture of butanol/ethanol (1:1) to a total quantity of 500 ml. The solution is filtered over a polyamide filter of 0.5 μm. The solution obtained is suitable for the manufacture of an additional layer of silicon dioxide.

In accordance with exemplary embodiment 1, a layer of this TEOS solution is spun onto the conductive coating. The number of revolutions is 150 r.p.m. The layer is maintained at a temperature of 160° C. for 30 minutes, which results in a satisfactorily adhering, smooth layer of silicon dioxide. This additional layer of silicon dioxide has a thickness of 200 nm and a refractive index of 1.44.

The scratch resistance of the additional layer is tested by means of a conical diamond which is moved over the surface with a force of 50 g, in which test it is established that any scratches formed are invisible to the naked eye.

The hardness is tested by means of a pencil test, in which pencils of different hardnesses to which a force of 7.5N is applied are moved over the surface of the layer at an angle of 45° at a rate of 0.05 m/s. According to this test, the coating in accordance with the invention has a degree of hardness of 6 H.

The abrasion resistance of the additional layer is determined by rubbing the same surface of the layer twenty times over a length of 25 mm with a Lion 50-50 eraser with a force of 10N. The outcome of the test is that any scratches on the rubbed surface are invisible to the naked eye.

Exemplary embodiment 3

A quantity of 40 g tributoxy-aluminate is dissolved in 48 g isopropanol to which 21 g ethyl acetoacetate are added as the complexing agent. This solution is added to a mixture of the following silanes:

16 g phenyl trimethoxysilane 120 g 3-glyeidoxypropyl-trimethoxysilane (Formula: FIG. 2)

9 g 3-aminopropyl-triethoxysilane.

Subsequently, 100 g isopropanol and 100 g diacetone alcohol are admixed. The mixture is then hydrolysed by adding water step by step until the stoichiometric quantity of water has been added; meanwhile the mixture is cooled by means of an ice bath. After all the water has been added, the solution is stirred at room temperature for 2 hours. Subsequently, the solution is filtered.

The solution obtained comprises alkoxy compounds in the following molar percentages:

10 mol % phenyl trimethoxysilane 65 mol % 3-glycidoxypropyl-trimethoxysilane 5 mol % 3-aminopropyl-triethoxysilane 20 mol % tributoxy aluminate.

The coating solution obtained is subsequently spin coated onto the conductive coating obtained in accordance with exemplary embodiment 1 at a rate of 200 r.p.m., whereafter it is cured for 1 hour at 160° C. The additional layer comprises a composite material of an inorganic network of silicon oxide and aluminium oxide with intertwined and chemically bonded polyether chains. The layer can be manufactured at a temperature at which the components of the cathode ray tube am not damaged. The additional layer thus obtained has a thickness of 4 μm.

The thickness of the filtering layer obtained is governed, inter alia, by the quantity of solvent and the number of revolutions during spin coating of the layer.

The adhesion of the additional layer to the glass surface complies with the tape-test requirements.

The scratch resistance and abrasion resistance meet the requirements mentioned in exemplary embodiment 2.

The hardness ranges between 7 H and 8 H.

Exemplary embodiment 4

Exemplary embodiment 1 is repeated, with this difference that the coating solution does not comprise 3-glycidoxypropyl-trimethoxysilane. Instead the display screen is pretreated with a primer solution after it has been cleaned, said primer solution being made from:

23.75 ml isopropanol 1.25 ml demineralised water 0.05 g N-(trimethoxysilylpropyl)pyrrole. The primer solution is applied by spin coating. The layer thus formed is subsequently dried at 110° C. for 1 minute.

The coating of poly-3,4-ethylene dioxythiophene having a thickness of 60 nm, obtained in accordance with exemplary embodiment 1, is successively provided with a first additional layer of silicon dioxide, a second additional layer of titanium dioxide and a third additional layer of silicon dioxide. The first additional layer of silicon dioxide is manufactured by means of a solution of TEOS, as described in exemplary embodiment 2. The layer is spin coated at a rate of 450 r.p.m. for 30 seconds. The layer is then dried at 160° C. for 1 minute. A TEOS solution is spin coated onto this 79 nm layer for 30 seconds at a rate of 1100 r.p.m. The layer obtained is dried at 160° C. for 1 minute and has a thickness of 35 nm. The total layer thickness of the first additional layer of silicon dioxide is 79+35=114 nm.

The second additional layer of titanium dioxide is manufactured from a solution comprising:

35 g ethanol 0.83 g hydrochloric acid (6 mol/l)

2.63 g tetraethoxy titanate (TEOTi).

The preparation takes place in a manner similar to that of the TIEOS solution in accordance with exemplary embodiment 2. This solution is spin coated onto the first additional layer of silicon dioxide at a rate of 450 r.p.m. for 30 seconds and, subsequently, dried at 160° C. for 1 minute. The layer thickness of the second additional layer of titanium dioxide is 100 nm.

The third additional layer of silicon dioxide having a thickness of 79 nm is obtained as described hereinabove.

The display screen with the layer packet is subsequently heated in a furnace at 170° C. for 30 minutes.

The coating has a sheet resistance of 550 Ω/□. The scratch resistance, hardness and abrasion resistance meet the test requirements described in exemplary embodiment 2. The adhesion meets the tape-test requirements. Reflection at a wavelength of approximately 535 nm is less than 0.5%.

Exemplary embodiment 5

The coated display screens having a diagonal of 38 cm (15 inches) are tested for their ability to shield against electromagnetic radiation. The relevant cathode ray tubes are operated at a voltage of 25 kV. The field intensity E in V/m is measured at a distance of 0.3 m from the display screen. Measurements are carried out in two frequency ranges, namely 50 Hz–2 kHz, referred to as ELF (Extra Low Frequency), and 2 kHz–400 kHz, referred to as VLF (Very Low Frequency).

In both ranges, the electric field intensity E must remain below a certain limit, i.e.:

E<10 V/m for ELF, and

E<1 V/m for VLF.

A display screen without an electroconductive coating (number 1 in the Table) is used as a comparative example.

A display screen (number 2 in the Table) comprising a coating having a sheet resistance of 7 kΩ/□ is used as the second exemplary embodiment. This layer is manufactured by adding 50 wt. % of a hydrolysed TEOS solution to the solution of 3,4-ethylene dioxythiophene. As a result, the polymeric layer formed also comprises homogeneously distributed silicon dioxide and the sheet resistance is increased.

Display screen number 3 comprises a coating in accordance with the invention having a sheet resistance of 1 kΩ/□ and an additional coating of silicon dioxide in accordance with exemplary embodiment 2.

Display screen number 4 comprises a coating in accordance With the invention having a sheet resistance of 1 kΩ/□ and an additional coating of a composite inorganic/organic polymer in accordance with exemplary embodiment 3.

The results are listed in the Table.

TABLE

| Number | coating | ELF (V/m) | VLF (V/m) |
|---|---|---|---|
| 1 | no coating | 34.0 | 9.05 |
| 2 | 7 kΩ/□ | 1.3 | 4.23 |
| 3 | 1 kΩ/□ + SiO$_2$-layer 200 nm | 1.4 | 0.62 |
| 4 | 1 kΩ/□ + composite layer 4 μm | 1.4 | 0.26 |

The results of the coatings 3 and 4 in accordance with the invention clearly demonstrate a shielding effect. The measured field intensities are far below the permissible values of, respectively, 10 and 1 V/m. Display screen number 1 does not meet the requirements. Display screen number 2 does not meet the VLF requirement of 1 V/m. A sheet resistance of 1 kΩ/□ is amply sufficient to shield effectively from electromagnetic radiation. It is estimated that a sheet resistance of maximally 3 kΩ/□ can just meet the shielding requirements.

Exemplary embodiment 6

Figure 6:
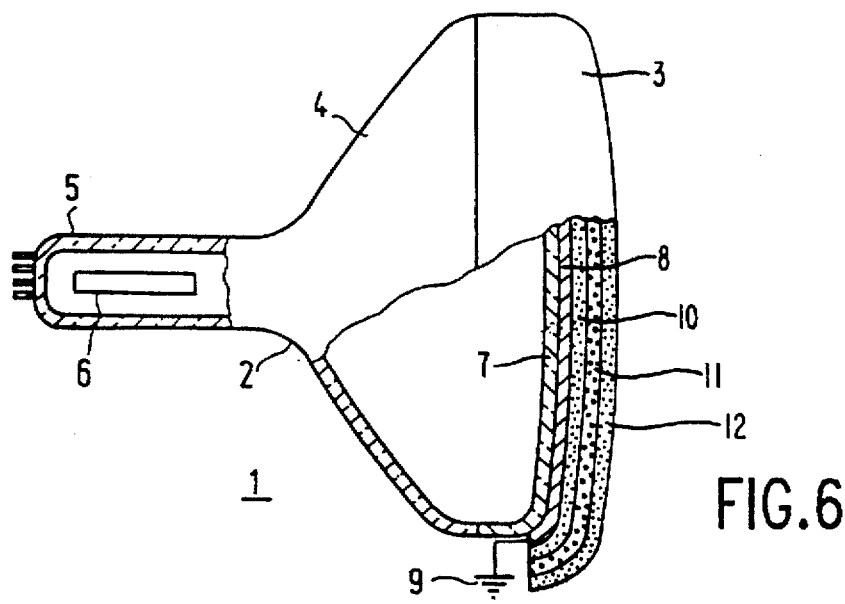

FIG. 6 is a schematic, cut-away view of a cathode ray tube 1 which is known per se and which has a glass envelope 2 comprising a display screen 3, a cone 4 and a neck 5. In the neck there is provided one (or three) electron gun(s) 6 for generating an electron beam. This electron beam is focused on a phosphor layer on the inside 7 of the display screen 3. The electron beam is deflected across the display screen in two mutually perpendicular directions by means of a deflection coil system. The display screen 3 is provided on the outside with an electroconductive coating 8 (layer thickness is not to scale) in accordance with the invention. The coating 8 is galvanically connected to earth 9, the coating 8 is provided with a first additional layer of silicon dioxide 10, a second additional layer of titanium dioxide 11 and a third additional layer of silicon dioxide 12. The layers 10, 11, and 12 being formed as described in the Exemplary embodiment 4.

The invention enables an electroconductive coating for a display screen of a cathode ray tube to be manufactured in a simple manner, the sheet resistance of the coating being so low that said coating provides an effective shield against electromagnetic radiation.

We claim:

1. A cathode ray tube comprising a display screen having an electroconductive coating which contains poly-3,4-ethylene dioxythiophene, characterized in that the coating has a layer thickness of maximally 100 nm and a sheet resistance of less than 3 kΩ/□.

2. A cathode ray tube as claimed in claim 1, characterized in that the coating is covered with an additional layer of silicon dioxide having a thickness of 50–250 nm.

3. A cathode ray tube as claimed in claim 1, characterized in that the coating is successively covered with a first additional layer of titanium dioxide and a second additional layer of silicon dioxide, the coating and the additional layers having a thickness such that the layers jointly exhibit an antireflective effect.

4. A cathode ray tube as claimed in claim 1, characterized in that the coating is successively covered with a first additional layer of silicon dioxide, a second additional layer of titanium dioxide and a third additional layer of silicon dioxide, the coating and the additional layers having a thickness such that the layers jointly exhibit an antireflective effect.

5. A cathode ray tube as claimed in claim 1, characterized in that the coating is covered with an additional layer of a composite of an inorganic network of at least silicon oxide and chains of an organic polymeric component intertwined therewith.

6. A cathode ray tube as claimed in claim 2, characterized in that the additional layer comprises a yellow dye.

7. A cathode ray tube as claimed in claim 5, characterized in that the additional layer comprises a yellow dye.

* * * * *